May 16, 1967  M. CALTHORPE  3,319,996
EXTENSIBLE VEHICLE ROOF
Filed Aug. 6, 1964  4 Sheets-Sheet 1
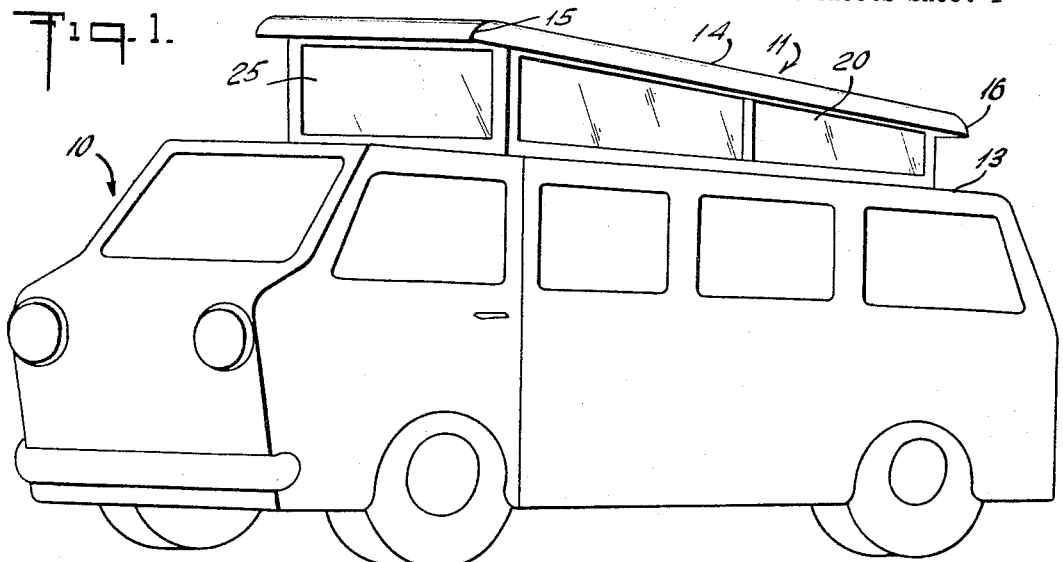
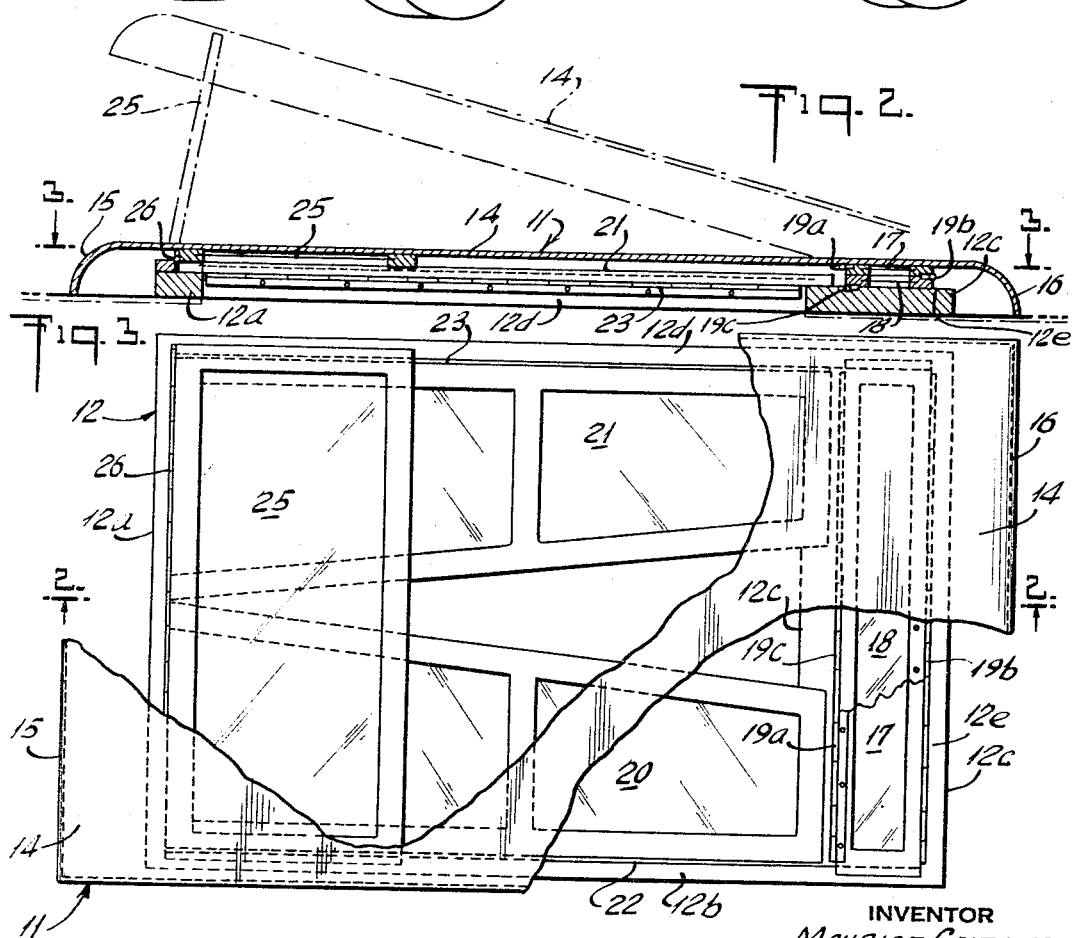
INVENTOR
MAURICE CALTHORPE
BY Nolte & Nolte
ATTORNEYS

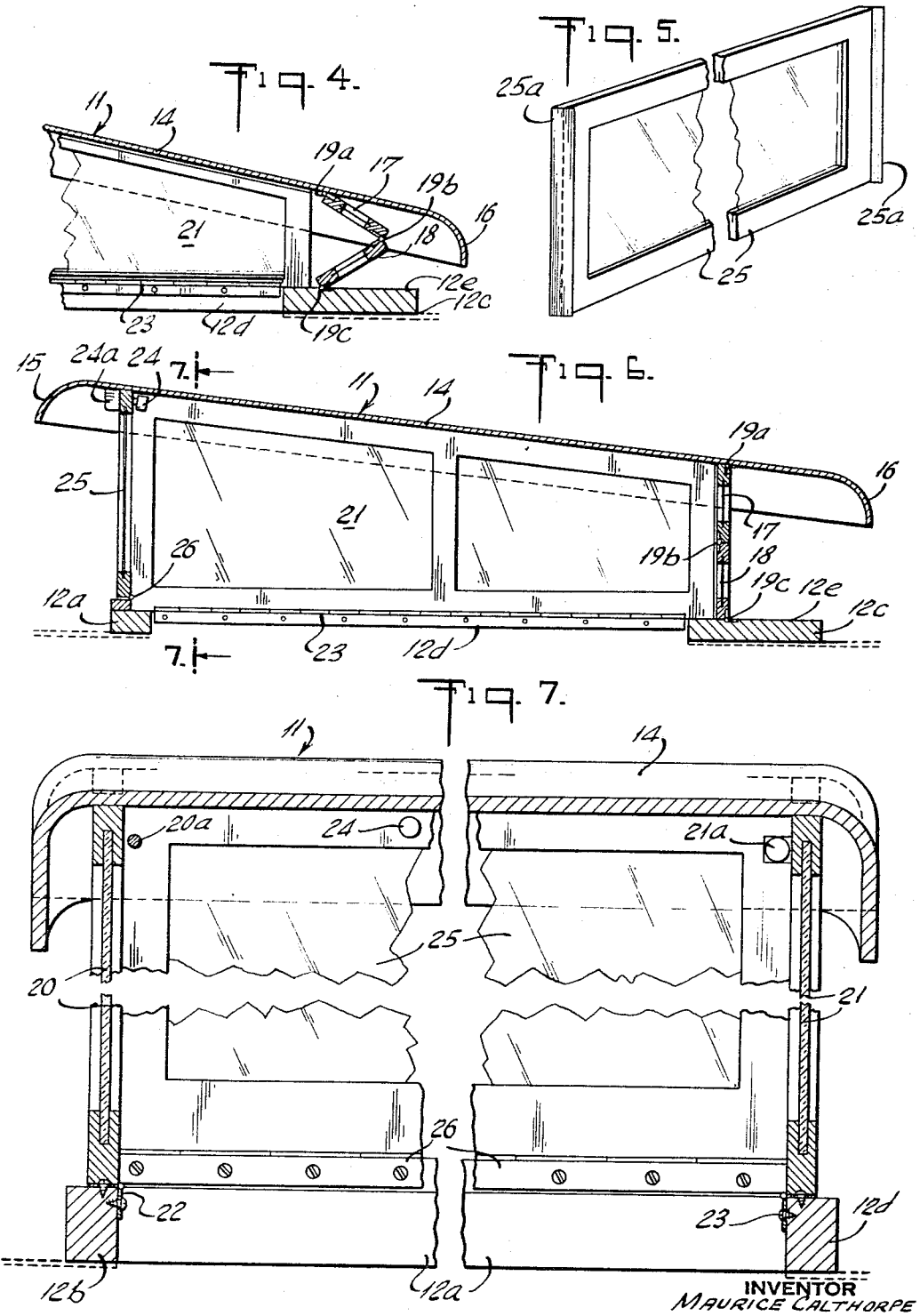

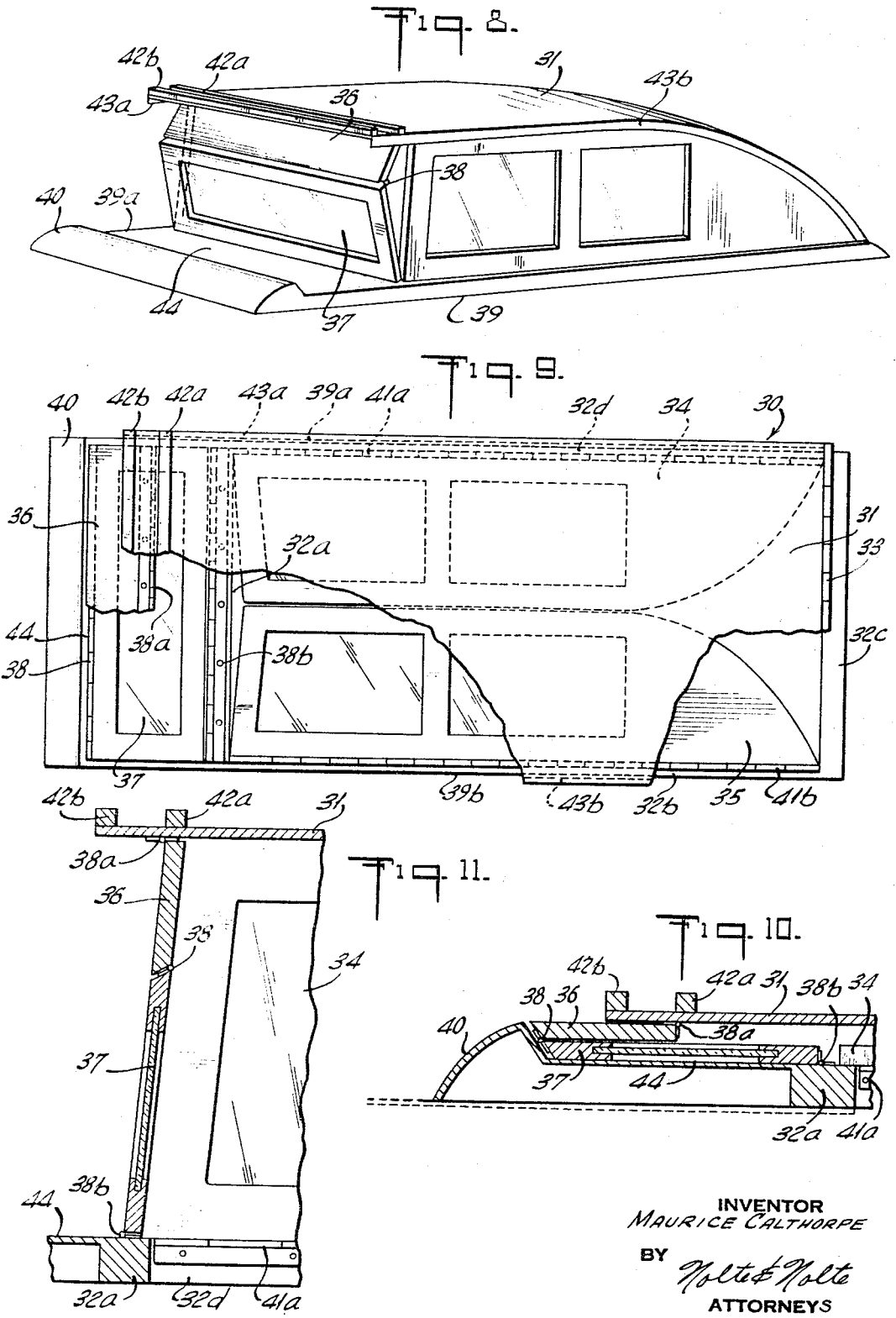

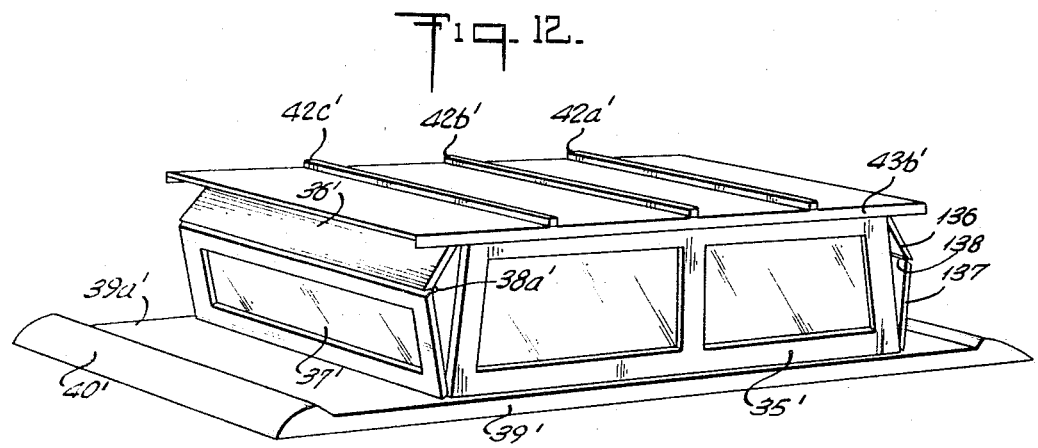
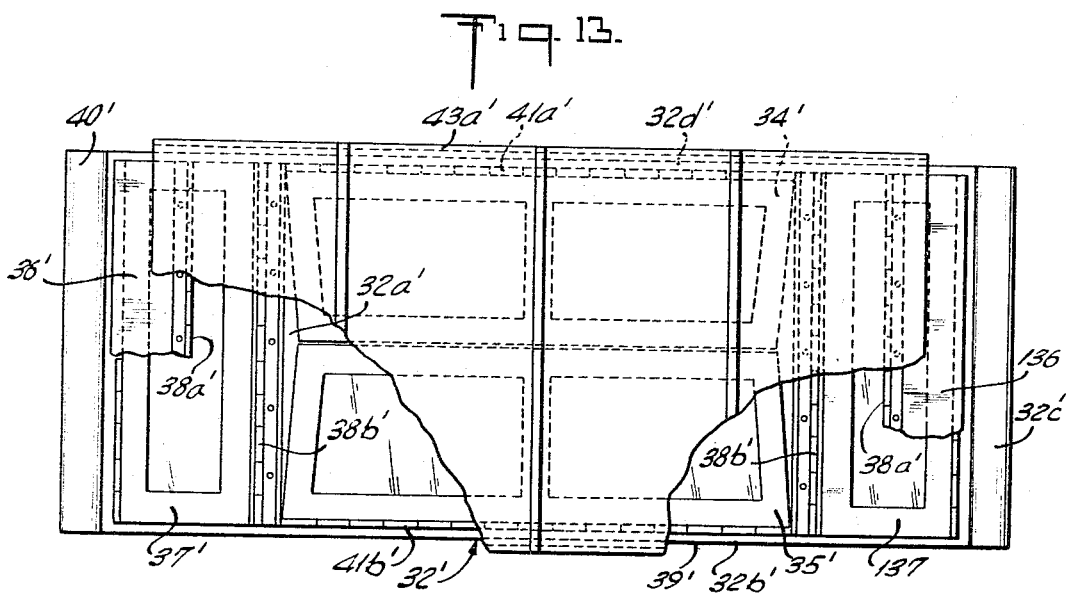
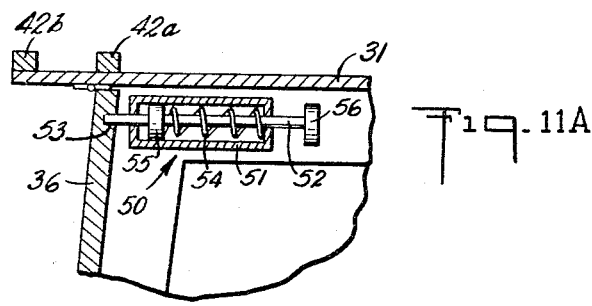

United States Patent Office 3,319,996
Patented May 16, 1967

3,319,996
EXTENSIBLE VEHICLE ROOF
Maurice Calthorpe, 369 Oakridge Road,
Los Altos, Calif. 94022
Filed Aug. 6, 1964, Ser. No. 387,857
1 Claim. (Cl. 296—137)

This invention relates to roof construction units for vehicles or the like. More particularly, it relates to a hinged roof construction which can be briefly attached to a vehicle to provide more head room or space for the vehicle.

It is an object of my invention to provide a roof construction which is readily adapted to increase the head room or vertical storage space within the vehicles.

It is another object of my invention to provide a roof construction that is readily adapted to convert the passenger or loading area of comparatively small vehicles such as utility wagons, station wagons, travel trailers, cabins of power-boats and the like, into comfortable living quarters or into expanded loading areas.

It is a further object of this invention to provide such a roof construction that is simple in design, easily and economically applied in converting standard vehicle, is easily operated and is economical to fabricate.

It is another object of this invention to provide a roof construction for attachment to the top of the vehicle, comprising base, a plurality of lateral panels, and a front panel, and means for interconnecting the panels, and front panel.

FIG. 1 is a perspective view of a utility or station wagon showing the embodiment of my invention in an open or expanded condition;

FIG. 2 is a sectional side view of the embodiment;

FIG. 3 is a plan view of the embodiment taken on line 3—3 of FIG. 2;

FIG. 4 discloses a partially broken away side view depicting a partially open rear end view of the embodiment;

FIG. 5 discloses a partial isometric view depicting aluminum corner plate and front end panel of the embodiment;

FIG. 6 is a longitudinal sectional view showing the embodiment in expanded or open condition;

FIG. 7 is a broken away sectional view taken on line 7—7 of FIG. 6;

FIG. 8 is a perspective of a modification of the preferred embodiment in partially open or a partially expanded condition;

FIG. 9 is a partly broken away plan view of the modification in collapsed condition (roof being flat);

FIG. 10 shows partly broken away side view wherein the end panels of the modified embodiment of FIG. 7 are in a fully folded condition;

FIG. 11 shows a partly broken away end panel of the modified embodiment of FIG. 7 in a fully expanded condition;

FIG. 11A shows the details of a releasable lock mechanism;

FIG. 12 is a perspective of a modification of the embodiment in a partially open or partially expanded condition; and FIG. 13 is a partly broken away plan view of the modification of FIG. 12 in collapsed condition.

On FIG. 1 there is shown a utility wagon 10 having its roof open or sufficiently cut away so that roof construction unit 11 may be mounted in any suitable manner, and will provide the desired amount of head room or additional space for facilitating proper movement in the wagon. As shown in FIGS. 2 to 6 of the drawings, the unit has a base 12 consisting of interconnecting base members 12a, 12b, 12c and 12d, respectively. The base is of any suitable size, the front and rear members 12a and 12c being of same width as members 12b and 12d to provide an area adapted to be coextensive with the opening in the top of the wagon. Furthermore, the base may be coextensive with the sides or edges of the roof 13 forming the opening to be covered by the roof construction unit 11. Once this construction has been attached to the wagon in any suitable manner, it forms a forms a permanent part thereof, although if desired such unit can be removed.

Base members 12a, 12b, 12c and 12d are each provided with connecting means for pivotally retaining side, front and rear movable panels. Roof top 14 of unit 11 is so made as to have forward and rear contoured or downwardly curved portions 15 and 16, respectively, and depending side walls so that when the unit is collapsed the roof top will be symmetrical with the rest of the roof of the vehicle. Said contoured or curved portions 15 and 16, respectively, are adapted to extend over the base 12 thereby covering the same when roof top 14 is collapsed so as to provide the desired symmetry to the top of the wagon.

Side panels 20 and 21 are provided with windows or transparent members to permit visual observation from the interior of the vehicle. Said panels are connected to the base members 12b and 12d, respectively, by means of hinges 22 and 23, respectively. It is to be noted that hinges 22 and 23 extend the full length of the connection, between the panels and the base members so as to facilitate smooth movement of the panels on the hinges as a pivot.

The respective panels are each provided with interiorly disposed spring locking means 24 to engage front panel 25 at either end thereof. Panel 25 is also provided with a window and is connected at its bottom front portion with forward base member 12a by means of a hinge 26 coextensive with the length of the panel. Each side of panel 25 is provided with metallic, preferably aluminum corner plate 25a, which plate is adapted to abut the front edge of side panel 20 or 21. Top rear panel 17 is hinged at its top to the underside of the roof 14 by a hinge 19a. The bottom side of the panel 17 is pivotally connected to the top of rear panel 18 by means of the hinge 19b. The bottom side of panel 18 features a hinge 19c which pivotally attaches panel 18 to the top surface 12e of rear member 12c of the base 12.

A stop member 24a is provided at the under portion of the forward end of roof top 14 to engage the upper front of panel 25.

In adjusting the component parts of the unit, the following procedure is used. Roof 14, which is of a rigid structure, is pushed upwardly at its forward end, and the front panel 25 is raised on its hinges 26 toward the vertical position. As soon as the front panel reaches full vertical position (i.e. becomes perpendicular to base 12) it becomes engaged by the stop member 24a and locked against the roof by spring locking means 24 thereby avoiding excessive overhang of the front portion of the roof 14. After this, side panels 20 and 21 are swung outwardly on their respective hinges 22 and 23 towards the vertical positions thereof. In concert with the upward movement of these panels, top rear panel 17 and bottom rear panel 18 simultaneously raise toward the vertical position. As soon as the side panels 20 and 21 reach vertical position they are locked against forward panel 25 and top rear panel 17 by locking means 20a and 21a. These locking members comprise plunger housings mounted on the side panels having spring driven plungers which enter openings in the forward panel 25 and the top rear panel 17, and thus prevent pivotal inward folding movement of the side panels. At vertical position, top rear panel 17 and bottom rear panel 18 will be at an incline as shown in FIGS. 2, 4 and 6 because of the greater height of forward panel 25.

If the front panel 25 and the rear panels 17 and 18 are of equal height, the front panel may also be double hinged (not shown) to hinge simultaneously with the rear panels.

A roof construction of the type hereinabove described is flat so as to become a symmetrical part of the roof of the vehicle as shown. It will be further noted that the parts can be readily collapsed when it is not necessary to use the unit construction for additional headroom.

With respect to the embodiment illustrated in FIGS. 8 to 11, inclusive, the roof construction or unit 30 is provided with a roof top 31 which takes a form of a roof sheet as shown. This roof top 31 is mounted on a base 32 of any suitable opening size, which base being adaptable for attachment to the open roof of the vehicle. Base 32 contains interconnecting base members 32a, 32b, 32c and 32d, respectively, and is suitable for mounting onto the roof 13 of wagon 10 (see FIG. 1). In the alternative said base may be of one piece. Roof top 31 is connected at its rear end to base member 32c by means of a hinge 33 which extends the full width of the roof top on said end. It will be noted that the roof top has depending side walls 43a and 43b to provide symmetrical appearance to the top of the wagon when the roof top is brought down toward roof 13 of the wagon.

Roof construction unit 30 is further provided with side window panels 34 and 35, respectively, which are attached to the base members 32d and 32b, respectively, by means of lateral hinges 41a and 41b, respectively.

With respect to the lateral hinged panels 34 and 35 the same may be of semi-annular outline as shown in FIGS. 8 and 9 so as to conform with the sides of the roof top when the same is raised. The roof construction 30 furthermore is provided with a pair of front panels 36 and 37 which extend across the front part of the construction. Said panels 36 and 37 are interconnected by means of a hinge 38. The upper front panel 36 is also connected to roof top 31 by means of hinge 38a and the lower front panel 37, which is generally larger than said upper panel and includes a rectangular opening, is connected to base 32a by means of hinge 38b. Panels 34, 35, 36 and 37 are swung outwardly to support said top 31 in raised position, and inwardly of the respective hinges when in collapsed position.

In order to keep said panels in raised vertical position there are provided stopping and locking members which may be of the same type as those referred to above for holding the panels of the form shown in FIG. 1 in place, that is, plungers mounted on the side panels for entering openings in the front panel portion 36. Thus, referring to FIG. 11A, it will be seen that the releasable lock means 50 illustrated therein includes the elongated plunger houing 51 which is fixed in any suitable way to the panel 34 and which has its opposed end walls formed with aligned openings through which the plunger 52 can freely pass. This plunger 52 extends along the axis of the housing 51 into an opening 53 which is formed in the upper, front panel section 36. Within the housing 51 the plunger 52 carries a collar 55 which may slidably engage the inner surface of the housing 51. One end of a coil spring 54 presses against the collar while the other end of the coil spring 54 presses against the right end wall of the housing, as viewed in FIG. 11A. Of course, at the exterior of the housing the plunger 52 carries a suitable handle 56. Therefore, with this construction when it is desired to collapse the plurality of panel means, it is only necessary for the operator to engage the handles 56 and retract the plungers 52 so as to release the side panels from the front panel. When the roof is to be set up, once the roof is raised, the side panels can be turned up and plungers 52 will snap into the openings 53 so as to releasably maintain the roof panels in their upright positions where they will provide a secure support for the roof top. Therefore, with the structure of the invention the releasable lock means is carried exclusively by the panels themselves for releasably locking the panels to each other in their upright positions where they form the sole support for the roof when it is in its elevated position. Thus, the panels themselves can be very simply connected to the base, as through simple hinges, inasmuch as the lock means is carried exclusively by the panels for releasably locking them in their upright position.

When roof top 31 is in a collapsed position, i.e. horizontal disposed, its front end is located upon collapsed panels 36 and 37. Both lateral sides of the roof top 31 are enclosed by side walls 39 and 39a, making adequate provisions for ready removal of the roof top 31 when it is so desired. On the upper portion of the roof top 31 adjacent the front edge thereof there are two longitudinal roof ribs 42a and 42b (see FIGS. 8, 9 and 10) for the manual raising or lowering of the roof top 31. As seen in FIG. 10, the folded front panels 36, 37 are located within a recess 44, on side of which terminates at front cap 40 and the other end at the forward portions of the side walls 39 and 39a.

In order to assemble the construction in the manner as shown in FIGS. 8 to 11 whereby the roof is raised, the roof top 31 (i.e. roof sheet) is pushed upwardly at its forward portion, simultaneously the side panels 34 and 35 are swung upwardly and outwardly on their respective hinges and held in position while the forward panels 36 and 37, are raised as shown in FIGS. 8 and 11 against stop members located in the front portion of the underside of the roof (not shown) and then held together by means of locking members (not shown), respectively.

With respect to the embodiment illustrated in FIGS. 12 and 13, the roof construction or unit is provided with a roof top which takes a form of a roof sheet as shown. This roof top, which can be flexible or rigid, is mounted on a base 32' of any suitable opening size, which base being adaptable for attachment to the open roof of the vehicle. Base 32' contains interconnecting members 32a', 32b', 32c' and 32d', respectively, and is suitable for mounting unto the roof 13 of wagon 10 (see FIG. 1). In the alternative said base may be one piece.

Base members 32a', 32b', 32c' and 32d' are each provided with connecting means for pivotally retaining side, front and rear movable panels. It will be noted that the roof top has depending side walls 43a', and 43b' to provide symmetrical appearance to the top of the vehicle when the roof top is brought down to roof 13 of wagon 10 (see FIG. 1).

Side panels 34' and 35' are provided with windows or transparent members to permit visual observation from the interior of the vehicle. Said panels are connected to the base members 32b' and 32d', respectively, by means of hinges 41a' and 41b'. The roof construction furthermore is provided with a pair of front panels 36' and 37' which extend across the front part of the construction. Said panels are interconnected by means of a hinge 38'. The upper front panel 36' is also connected to roof top by means of hinge 38a', and the lower front panel 37', which generally includes a window or transparent member, is connected to base 32a' by means of hinge 38b'. The rear panels 136 and 137 of the roof construction extend across the rear part of the construction and are interconnected by means of a hinge 138. The upper rear panel 136 is also connected to roof top by means of hinge 138a and the lower rear panel 137 is connected to base 32c' by means of hinge 38b. Panels 34', 35', 36', 37', 136 and 137 are swung outwardly to support said top in raised position, and inwardly of the respective hinges when in collapsed position.

In order to keep said panels in raised vertical position there are provided stopping and locking members (not shown). Locking members such as described in connection with the form of structure shown in FIG. 1 are entirely suitable for this analogous use. When roof top is in a collapsed position, i.e. horizontally disposed, its front end is located upon collapsed panels 36' and 37' and its back end upon collapsed panels 136 and 137. Both lateral sides of the roof top are enclosed by side walls 39' and 39a', making adequate provision for removal of the top when desired. On the upper portion of the roof top, equally spaced from each other and from the front and back edges are three longitudinal roof ribs 42a', 42b' and 42c' (see FIG. 12) for the manual raising or lowering of the roof top.

From the foregoing, it will be noted that there is provided a novel type of roof construction which can be readily attached to the top of any form of vehicle and which can be collapsed or expanded into open position as the case may be, depending upon the desires of the owner of the vehicle. Furthermore, the roof constructions as illustrated and described herein are made in such a manner as to become symmetrically a part of the vehicle on to which it is attached. This type of construction is highly useful in automotive vehicles of various types, depending upon where additional head room is desired. This unit furthermore can be used for many purposes in a vehicle. Extra head room in the vehicle is used as desired for storage, sleeping quarters, or for refrigeration while at the same time providing protection against inclement weather.

A roof construction made according to the present invention may be made of any suitable material, such as plastic molded material, forged metal plating, or wood.

While preferred embodiments of the invention have been described and illustrated, it will be noted that various modifications as to arrangement of parts and use of materials may be made without departing from the spirit and scope of the invention as claimed. And, if desired, the invention can be fitted sideways on the vehicle roof so that the front panel is on the right or left side of the vehicle, with adjustment in dimensions, if required.

What I claim is:

A collapsible roof construction for attachment to the open roof of a vehicle comprising a base for attachment onto the roof of said vehicle, a roof top including a flexible roof sheet transversely connected at its rear portion to said base, said roof top having a plurality of dependent opposed parallel walls, a pair of opposed inwardly movable side panels pivotally connected to the base and located in opposed relationship to each other, said panels being adapted to be swung from a horizontal to a vertical fixed position, a pair of pivotally interconnected front panels hingedly mounted on the front portion of the base adapted to be raised so as to support the roof member in raised position, said front panels being set on the base inwardly with respect to the forward end of the roof, and means for locking the side and front panels to maintain the same in a fixed upright position supporting the roof top, said pair of interconnected front panels, consisting of a top panel and a bottom panel, when horizontally folded one above the other being located within a recess of the front portion of the roof construction, and which front panels are adapted to assume a substantially vertical position when the roof top and the side panels are raised.

References Cited by the Examiner
UNITED STATES PATENTS

| | | | |
|---|---|---|---|
| 2,926,042 | 2/1960 | Calthorpe | 296—137 |
| 3,061,359 | 10/1962 | Pearlman | 296—137 |
| 3,134,198 | 5/1964 | Calthorpe | 296—137 X |
| 3,146,018 | 8/1964 | Pearlman | 296—137 X |

FOREIGN PATENTS

| | | |
|---|---|---|
| 839,158 | 6/1960 | Great Britain. |
| 840,255 | 7/1960 | Great Britain. |

BENJAMIN HERSH, *Primary Examiner.*

A. HARRY LEVY, *Examiner.*

C. C. PARSONS, *Assistant Examiner.*